(12) United States Patent
Dong

(10) Patent No.: US 8,437,801 B2
(45) Date of Patent: May 7, 2013

(54) RADIO COMMUNICATIONS DEVICE, UNIVERSAL INTEGRATED CIRCUIT CARD AND RELATED METHOD AND COMMUNICATIONS DEVICE

(75) Inventor: Olivier Dong, Tokyo (JP)

(73) Assignee: NEC Corporation, Tokyo (JP)

( * ) Notice: Subject to any disclaimer, the term of this patent is extended or adjusted under 35 U.S.C. 154(b) by 351 days.

(21) Appl. No.: 12/742,010

(22) PCT Filed: Dec. 12, 2008

(86) PCT No.: PCT/JP2008/073138
§ 371 (c)(1),
(2), (4) Date: May 7, 2010

(87) PCT Pub. No.: WO2009/075390
PCT Pub. Date: Jun. 18, 2009

(65) Prior Publication Data
US 2010/0248748 A1 Sep. 30, 2010

(30) Foreign Application Priority Data
Dec. 13, 2007 (GB) .................................. 0724317.3

(51) Int. Cl.
*H04B 1/38* (2006.01)
(52) U.S. Cl.
USPC ..................... 455/558; 455/456.1; 455/456.2; 455/550.1; 455/551
(58) Field of Classification Search .................. 455/558, 455/456.1–456.3, 550.1, 551, 432.2–432.3
See application file for complete search history.

(56) References Cited

U.S. PATENT DOCUMENTS

| 6,975,941 | B1 | 12/2005 | Lau et al. |
| 7,076,273 | B2 | 7/2006 | Laumen et al. |
| 2004/0147284 | A1 | 7/2004 | Laumen et al. |
| 2005/0246282 | A1* | 11/2005 | Naslund et al. ................ 705/52 |
| 2007/0155400 | A1 | 7/2007 | Madsen |
| 2007/0200003 | A1* | 8/2007 | Deprun et al. ................ 235/492 |

FOREIGN PATENT DOCUMENTS

| EP | 1688867 | 8/2006 |
| EP | 1796406 | 6/2007 |
| JP | 8-044839 | 2/1996 |
| JP | 2001-313714 | 11/2001 |
| JP | 2004-192613 | 7/2004 |
| JP | 2005-039440 | 2/2005 |

OTHER PUBLICATIONS

Extended European Search Report issued on Aug. 31, 2011 in counterpart European Patent Application No. 08 85 9652.3.

(Continued)

*Primary Examiner* — Wayne Cai
(74) *Attorney, Agent, or Firm* — Young & Thompson

(57) ABSTRACT

The present invention provides for a UICC interface and related interfacing method, for use in a mobile radio communications device and including an element enabling the UICC to provide an indication that at least one service requiring location data is present in the UICC, an element for UICC to receive notification that a source of location data is available, an element for allowing the UICC to initiate transfer of location data thereto, an element for the actual transfer of the location data to the UICC, and an element enabling the UICC to terminate the transfer of the location data, and wherein the location data can be provided from a GPS module or remotely in a contact-less manner.

20 Claims, 2 Drawing Sheets

OTHER PUBLICATIONS

Gemalto et al., "Availability of Location Information in the UICC", 3GPP Draft; S1-071935, 3RD Generation Partnership Project (3GPP), Nov. 16, 2007.

International Search Report, PCT/JP2008/073138, Mar. 17, 2009.

UK Patent Office issued a Great Britain Search Report dated Mar. 30, 2010, Application No. GB0727317.3.

* cited by examiner

RADIO COMMUNICATIONS DEVICE, UNIVERSAL INTEGRATED CIRCUIT CARD AND RELATED METHOD AND COMMUNICATIONS DEVICE

BACKGROUND OF THE INVENTION

1. Field of the Invention

The present invention relates to an interface for a Universal Integrated Circuit Card (UICC) for use within a mobile radio communications device Mobile Equipment (ME) such a cell phone handset and to a related method of transferring data to/from the UICC.

2. Description of the Related Art

Known ME used within mobile radio communications networks employ UICCs upon which an increasing amount of data, and thereby application possibilities, can be stored.

Known interfaces between the UICC and the ME are described in existing Third Generation Partnership Project (3GPP) specifications (for example, TS31.111) and it is known for these to allow the ME to deliver some form of location information/data to the UICC.

This is generally achieved by way of the current USIM toolkit feature employing the terminal response of the Provide Local Information command, and via the Envelope Event Download Location Status.

However, such location information generally only comprises the Mobile Country Code (MCC), the Mobile Network Code (MNC), the Location Area Code (LAC) and the Cell Identity Value (Cell Id).

Thus, as will be appreciated, the interface for the UICC has a capability allowing for the transfer of some location data although the capabilities of the interface are somewhat limited in that the most specific element of location information that the interface can handle comprises the Cell Id and which of course relates to the cell in which the MD/ME is located. Since the area of one cell could be relatively large, for example in the area of several square kms, the location data that can be handled by the interface is of limited value and of course cannot be employed within applications requiring more precise and accurate location information.

The current interfacing arrangements for the UICC within a mobile radio communications device are therefore disadvantageously limited and serve to restrict the nature of applications that could be employed on the UICC irrespective of the ongoing increase in storage capability/capacity thereof.

BRIEF SUMMARY OF THE INVENTION

The present invention seeks to provide for a mobile radio communications device for a UICC having advantages over known such communications devices and which, in particular, allows for an increase in the potential for usage of the UICC with an increasing variety of location-specific applications.

According to one aspect of the present invention there is provided a mobile radio communications device includes:
a source of geographical location data;
means for notifying a universal integrated circuit card (UICC) that a source of geographical location data is present;
means for receiving, from the UICC, a signal indicating that said UICC requires geographical location data;
means for retrieving geographical location data from said source of geographical location data, and for generating a signal carrying the retrieved geographical location data, in response to receipt of said signal indicating that said UICC requires geographical location data; and
means for sending the generated signal carrying the retrieved geographical location data to the UICC.

According to one aspect of the present invention there is provided a method performed by a mobile radio communications device having a source of geographical location data, of providing said geographical location data to a universal integrated circuit card (UICC), the method comprises:
notifying the UICC that said source of geographical location data is present;
receiving, from the UICC, a signal indicating that said UICC requires geographical location data;
retrieving geographical location data from said source of geographical location data, and generating a signal carrying the retrieved geographical location data, in response to receipt of said signal indicating that said UICC requires geographical location data; and
sending the generated signal carrying the retrieved geographical location data to the UICC.

According to one aspect of the present invention there is provided a universal integrated circuit card (UICC) comprising:
means for receiving notification that a source of geographical location data is available in a mobile radio communications device;
means for generating a signal indicating that said UICC requires geographical location data;
means for sending said generated signal indicating that said UICC requires geographical location data to the mobile radio communications device;
means for receiving a signal carrying the required geographical location data from the mobile radio communications device.

The aforementioned device or method proves particularly advantageous insofar as the interface can serve to allow for the delivery of detailed location data to the UICC.

This can prove particularly advantageous insofar as it is recognized that, from 3GPP Rel-7 onwards, the UICC is likely to integrate memory capacity of up to several Gigabytes. The UICC therefore likely to offer the capacity of an important applications area for the mobile radio communications device and indeed for adoption by mobile network operators seeking to offer location-based services by way of the mobile radio communications device. The device or method of the present invention advantageously enables some of these potential new services to be based upon very precise location information.

According to one arrangement, the mobile radio communications device can employ a Global Positioning System (GPS) module for the provision of the precise location data.

As such, the interface means of the UICC interface can then comprise:
means allowing the UICC to inform the mobile radio communications device that services requiring GPS data are present in the UICC;
means allowing the mobile radio communications device to notify the UICC that a GPS module is present in the mobile radio communications device;
means allowing the UICC to activate the GPS module in the mobile radio communications device;
means allowing the mobile radio communications device to send location data to the UICC;
means allowing the UICC to deactivate the GPS module within the mobile radio communications device; and
means allowing the mobile radio communications device to inform the UICC whether or not the GPS module is currently available.

Insofar as GPS technology can provide for particularly accurate location information, the use of the radio communications device according to the present invention will allow UICCs of ever increasing capacity access to such accurate information in an attempt to maximize the number and range of location-related applications that can be provided.

Preferably, the radio communications device of the present invention can be based on the Universal Sim Application Toolkit (USAT) feature and will therefore advantageously serve to extend the current USAT functionalities and commands as based upon the Application Protocol Data Unit (APDU) as known from ETSI Technical Specifications.

According to one arrangement, the means allowing the UICC to inform the mobile radio communications device that services requiring GPS data are present within the UICC can be arranged to employ one, and indeed any, of the currently unused Interface Bytes of the Answer To Reset (ATR) sequence.

Preferably, the means allowing the mobile radio communications device to notify the UICC that a GPS module is present in the mobile radio communications device can be arranged to provide for static notification. Preferably, the means then is arranged for the definition of a new bit in the Terminal profile.

As an alternative, the aforementioned notification can be provided on a dynamic basis wherein said means is arranged for extending the existing event list as defined in the USAT feature by adding a new event, allowing for the UICC to register this new event using an Set-up Event List command, and allowing for the transfer of an Envelope Event Download-GPS "module status" to the UICC.

Preferably, the means allowing the UICC to activate the GPS module includes the definition of a further USAT command.

Further, the means allowing the mobile radio communications device to send the location data from the GPS module to the UICC is arranged for the defining a specific new envelope command "Envelope Data Download-GPS data".

Advantageously, the means arranged for the UICC to deactivate the GPS module in the mobile radio communications device is arranged for reuse of the aforementioned specific command for allowing the UICC to activate the GPS module as noted above.

Preferably, the means for allowing the mobile radio communications device to inform the UICC whether or not the GPS module is currently available is arranged to conduct three operations comprising the addition of a GPS module availability event to the existing event list as found in the USAT feature, registering this new event by way of the Set-up List Command and sending a new "Envelope Event Download-GPS module status" to UICC when the status of the GPS module transitions between available and unavailable.

In an alternative arrangement, the UICC interface can be USB-based such that, as compared with the above, the new commands arising in accordance with the interface no longer have to be based on the APDU. The commands then no longer comprise USAT commands.

Preferably, the means allowing the UICC to inform the mobile radio communications device that services requiring GPS data are present in the UICC is arranged to employ one or any of the currently unused Interface Bytes of the ATR sequence.

Then, the means allowing the mobile radio communications device to notify the UICC that GPS module is present in the ME and in a static manner, can comprise the definition of a specific new command that will be sent from the mobile radio communications device to the UICC.

As an alternative, the means for allowing the mobile radio communications device to notify dynamically the UICC that the GPS module is present in the ME can comprise the extension of the existing events list, and through the addition of a specific new command: Event Notification-GPS that will be sent from the mobile radio communications device to the UICC.

Yet further, the means allowing the UICC to activate the GPS module is arranged to define a specific new command that will be sent from the UICC to the mobile radio communications device.

Further, the means allowing the mobile radio communications device to send the location data from the GPS module to the UICC allows for the definition of a new command to be sent from the mobile radio communications device to the UICC.

Preferably, the means allowing the UICC to deactivate the GPS module in the mobile radio communications device is arranged such as to re-use the specific new command provided in accordance with the means for allowing the UICC to activate the GPS module and as described above.

The means allowing the mobile radio communications device to inform the UICC whether or not the GPS module is currently available can be arranged to offer three levels of functionality comprising extending the existing event list by the addition of a specific new event; defining a new event registration request demand that will be sent from the UICC to the mobile radio communications device; defining a new "Event Notification-GPS availability" command that can be sent from the mobile radio communications device to the UICC.

In accordance with a further feature of the present invention, the radio communications device of the present invention can be arranged to operate in a wireless manner.

In particular, in one embodiment the location data is obtained by way of a radio communications device embodying the present invention in a wireless manner from a device remote from the mobile radio communications device.

As such, the radio communications device of the present invention can then be arranged to specify and EVT_SEND_DATA event to pass location data from the Contact-Less Function (CLF) within the mobile radio communications device to the UICC.

The present invention can therefore comprise a contact-less interface to be based upon the Single Wire Protocal and the Host Controlled Interface as currently discussed in ETSI Smart Card Platform (SCP) standards.

It will therefore be appreciated that the present invention serves to increase the potential functionality offered within the UICCs of ever increasing capacity such that further services, based particularly on accurate location information, can then be offered by network operators through the use of the radio communications device of the present invention and example of such specific services comprise dynamic taxi-fleet management, location-based advertising, precisely locating friends/children or specific destinations such as restaurants, theatres, Banks and their related ATMs.

The invention also provides for a method of interfacing location data to a UICC in the mobile radio communications device and comprising the steps of providing an indication from the UICC to the mobile radio communications device that an application requiring location data is present, receiving notification at the UICC that a source of location data is available, initiating transfer of the location data to the UICC and subsequently allowing such transfer of the location data to the UICC and subsequently terminating, by way of the UICC, transfer of the location data.

In an embodiment in which location data is provided from the GPS module within the mobile radio communications device, the method can provide the steps of:
the UICC informing the mobile radio communications device that service is requiring GPS data are present in the UICC;
notifying, either statically or dynamically, the UICC that a GPS module is present in the mobile radio communications device;
activating the GPS module in the mobile radio communications device by way of the UICC;
sending location data from the mobile radio communications device to the UICC;
deactivating the GPS module within the mobile radio communications device by way of the UICC; and
informing the UICC whether or not the GPS module is currently available.

BRIEF DESCRIPTION OF THE DRAWINGS

The invention is described further hereinafter by way of example only, with reference to the accompanying drawings in which.

DETAILED DESCRIPTION OF THE PREFERRED EMBODIMENTS

Figure 1:
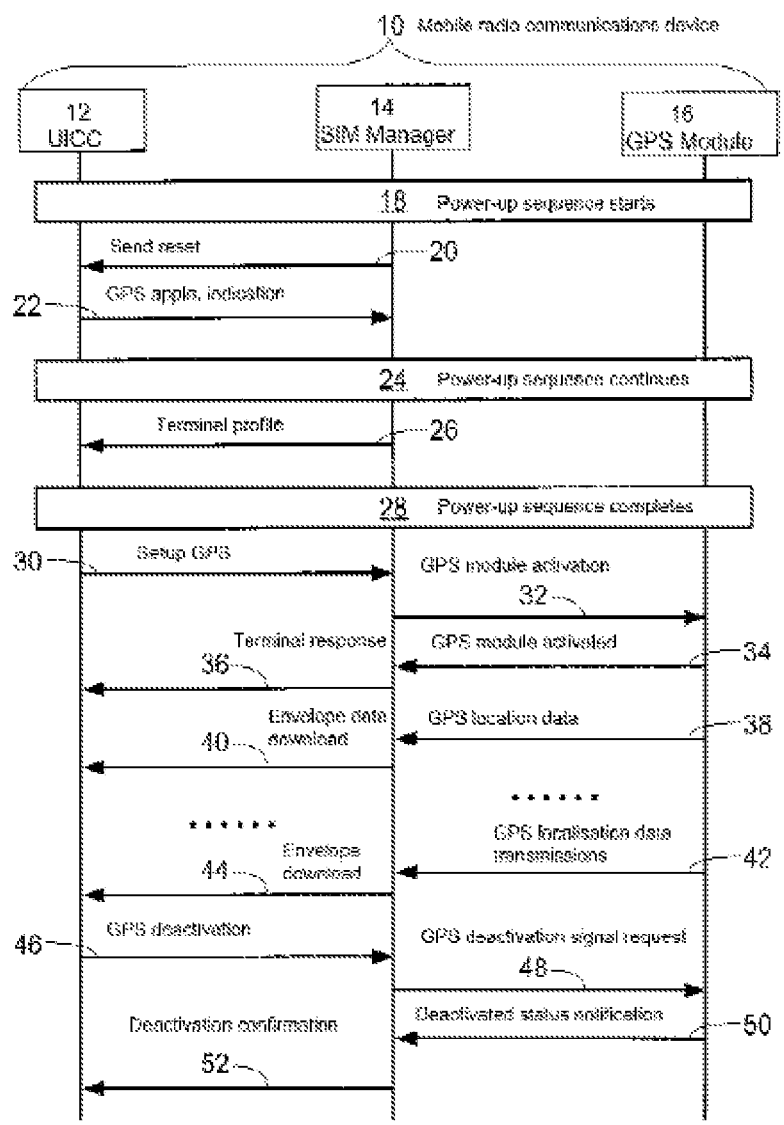
FIG. 1 comprises a signalling diagram arising in relation to a radio communications device according to an embodiment of the present invention.

According to one particular embodiment of the present invention, GPS technology is employed for providing particularly accurate location data, for example within a margin of a new metres.

As will be described further below, the present invention advantageously provides for the use of such location data as delivered from a GPS module within a mobile radio communications device and such that the GPS-originating location data becomes available for the whole UICC platform and so is not necessarily restricted for only one dedicated application available in the UICC. The location data is then accessibly by any application stored on the UICC.

According to another embodiment of the invention to be described below, the radio communications device of the present invention also allows for the retrieval of such precise location data from an external, i.e. contact-less, terminal other than the remote mobile radio communications device and through, for example, a contact-less interface arrangement such as defined by the ETSI SCP.

The radio communications device of the present invention therefore possesses particular functional characteristics so that the precise location data available from the GPS module or externally in a contact-less manner, is available to the UICC irrespective of the actual physical interface employed, i.e. whether ISO, High Speed Protocol, or contact-less.

In an embodiment in which the UICC is to receive the location data from a GPS module within the mobile radio communications device the interface advantageously has the characteristics of:
allowing the UICC to inform the mobile communications equipment that service is requiring GPS data are present in the UICC;
allowing the mobile radio communications device to notify the UICC either statically or dynamically that a GPS module is present in the mobile radio communications device;
allowing the UICC to activate the GPS module in the mobile radio communications device;
allowing the mobile radio communications device to send the location data to the UICC;
allowing the UICC to deactivate the GPS module in the mobile radio communications device; and
allowing the mobile radio communications device to inform the UICC whether the GPS module is currently available or not.

As will be appreciated from the following discussion, the embodiment of the present invention exhibiting such characteristics advantageously allows for the passage of far more accurate location data to the UICC to thereby open the possibility of development of new services on the UICC using such accurate location information.

An example of a radio communications device embodying the present invention is now described with reference to FIG. 1.

Here a signalling diagram is illustrated that arises within a mobile radio communications device 10 such as cell phone handset and employing a UICC 12, a SIM manager (part of the ME responsible for the communication with the UICC) 14 and a GPS module 16.

While the subject matter of the present invention focuses upon the interface between the UICC 12 and the SIM manager 14, the further detail of the manner of the interface between the SIM manager 14 and the GPS module 16 is not relevant to the present invention and there may indeed be other components of the mobile radio communications device provided for the transfer of location data from the GPS module 16 to the SIM manager 14.

Turning now to the accompanying drawing in greater detail a power-up sequence starts at 18 and this initiates a Send Reset signal 20 from the SIM manager 14 to the UICC 12. In response, the UICC 12 returns a signal 22 to the SIM manager 14 indicating that an application requiring GPS location data is actually present within the UICC 12.

The power-up sequence continues at 24 and the SIM manager 14 sends a return signal 26 to the UICC 12 comprising a terminal profile signal indicating that the GPS module 16 is present.

While, in the illustrated embodiment, the terminal profile is sent during the power-up procedure it should be appreciated that this could be sent at a later time.

The main controlling function however is that the UICC 12 is not to send any USAT command to the mobile radio communications device if there has been no terminal profile received by the UICC 12.

The power-up sequence completes at 28 with a SETUP GPS activation signal 30 from the UICC 12 to the SIM manager 14 and which implicitly requests the mobile radio communications device to send any available location data to the UICC 12.

Thus, this in turn serves to initiate a request GPS module activation signal 32 from the SIM manager 14 to the GPS module 16 which, in response to this activation, sends a GPS module activated signal 34 to the SIM manager 14 and which activation is confirmed by the SIM manager 14 for the UICC 12 by way of a terminal response confirmation signal 36.

GPS location data 38 is then retrieved from the GPS module 16 and delivered as part of an envelope data download 40 from the SIM manager 14 to the UICC 12.

Subsequent GPS localisation data transmissions 42 continue and are likewise delivered as part of an envelope download signal 44 from the SIM manager 14 to the UICC 12 as and when required and until the UICC 12 delivers a set-up GPS deactivation signal 46 which leads to a GPS deactivation signal request 48 originating in the SIM manager 14 and being delivered to the GPS module 16.

Once deactivated, the GPS module 16 delivers a notification of its deactivated status 50 to the SIM manager 14 which in turn provides a signal 52 confirming deactivation for the UICC 12.

It will of course be appreciated that the amount of GPS location data transmitted between the GPS location data signals 38 and 42 is dependent upon the particular application loaded within the UICC 12 and which requires the location data.

As should further be appreciated, a variety of embodiments of the present invention are envisaged dependent generally upon the interface technology employed.

Outlined below is the realisation over a mobile radio communications device-UICC ISO interface and based on the USAT feature as defined by ETSI TS 102 223 and which amounts to an expansion of current USAT functionalities, i.e. commands based on APDU as defined in ETSI TS 102 221 in order to provide support for the present invention.

For the aspect of interface allowing the UICC to inform the ME that services requiring GPS data are present in the UICC, one, or any, of the currently unused Interface Bytes of the ATR as defined in ISO 7816-3 can be employed and, for example, such that setting the byte to "00" is taken as an indication that there is no application within the UICC requiring use of the GPS module whereas, with the byte set to "01" is arranged to indicate the existence of applications requiring location data being present in the UICC.

A notification from the mobile radio communications device to the UICC that a GPS module is present within the mobile radio communications device can be provided in a static, or dynamic, manner.

For static notification, the invention serves to define a new bit within the Terminal Profile indicating that the mobile radio communications device contains a GPS module.

Figure 2:
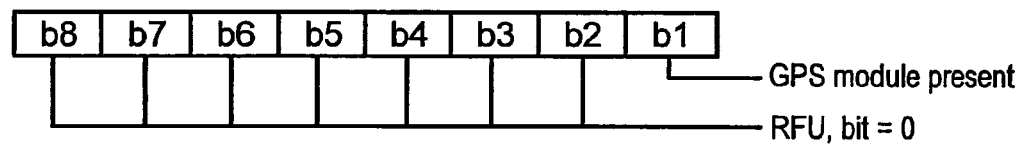
FIG. 2 is a schematic diagram illustrating the structure of a Terminal Profile byte according to an embodiment of the present invention.

An example of such a byte is illustrated in FIG. 2 where it will be appreciated that if bit 1, i.e. b1, is set to 1, this serves as an indication that the mobile radio communications device contains a GPS module and that location data could be available if required.

With regard to the possibility for dynamic notification, the arrangement here mirrors that discussed further below in connection with the technical realisation of allowing the mobile radio communications device to inform the UICC whether or not the GPS module is currently available.

With regard to the UICC being allowed to activate the GPS module, the invention can provide for the definition of a new USAT command identified as SETUP GPS.

The relevance of new command is illustrated further with reference to Table 1 below wherein the entries in the "Clause" column referred to the related clause as defined in the ETSI 102 223 specification.

TABLE 1

| Description | Clause | M/O/C | Min | Length |
|---|---|---|---|---|
| Proactive UICC command tag | 9.2 | M | Y | 1 |
| Length (A + B) | — | M | Y | 1 or 2 |
| Command Details | 8.6 | M | Y | A |
| Device Identifies | 8.7 | M | Y | B |

The details of this new USAT command are that the coding of the type of command is, as an example, 0x70 although this could be any other value which is not currently allocated as a proactive UICC command tag), further, this ideally would be added to Clause 9.4, and the coding of the command qualifier is "00" for a deactivated GPS command and "01" for an activate GPS command.

Of course, it should be appreciated that the source of this command is the UICC and that the destination is the mobile radio communications device within which it is located.

For the realisation of the feature of allowing the ME to send the location data from the GPS module to the UICC, a new envelope command "Envelope Data Download-GPS data" is defined and is described further with reference to Table 2 below.

TABLE 2

| Description | Clause | M/O/C | Min | Length |
|---|---|---|---|---|
| GPS data Download tag | 9.1 | M | Y | 1 |
| Length (A + B) | — | M | Y | 1 or 2 |
| Device identities | 8.7 | M | Y | A |
| GPS location data | To be added in TS 102 223 | M | Y | B |

The actual location data, i.e. the payload, is included within the "GPS location data" data object and the GPS Data Download tag comprising, as an example, "0xD3" (although any value not currently allocated as an existing tag could be used) is arranged to be added to Clause 9.1 of ETSI TS 102 223. The device identity here has UICC as destination and the mobile radio communications device as source.

Table 3 below provides a further detail of the "GPS location data" and the "GPS location data" tag comprises 0x71 as an example.

TABLE 3

| Byte(s) | Description | Length |
|---|---|---|
| 1 | GPS location data tag | 1 |
| 2 | Length | 1 |
| 3-Z | location data | Y |

As regards the detailed coding of the GPS location data, this is not discussed any further here otherwise than noting that it is up to the UICC application to interpret and process the data as required.

For the interface implementation allowing the UICC to deactivate the GPS module in the mobile radio communications device, one particular advantageous feature relates to the mere re-use of the new SETUP GPS command defined above in relation to the activation of the GPS module with the exception that the command qualifier be set to "00".

In situations in which the GPS module might be removable, or might be shared between the mobile radio communications device and UICC applications, the function allowing the mobile radio communications device to inform the UICC whether or not the GPS is currently available proves particularly useful and, in this particular embodiment of the present invention, comprises three functional parts.

First, the existing event list as defined in the USAT feature is extended through the provision of a new element identified as GPS module availability.

This is illustrated further with regard to Table 4 below and it should be appreciated that the event list content comprises a list of events of variable length, wherein each byte in the list defines a particular event and wherein each event type should not appear more than once within the list.

TABLE 4

| Byte(s) | Description | Length |
|---|---|---|
| 1 | Event list tag | 1 |
| 2 to Y + 1 | Length (X) of bytes following | Y |
| Y + 2 to X + Y + 1 | Event list | X |

With regard to coding, each byte in the event list is coded with one of the following values
"00"=MT call
"01"=Call connected
"02"=Call disconnected
"03"=Location status
"0F"=Browsing status
"10"=Frames Information Change
"11"=reserved for 3GGP (I-WLAN Access Status)
"20"=GPS module availability.

Secondly, the UICC is arranged to register to this new event by way of a SETUP Event List command as defined in TS 31.111 and as illustrated further below in relation to Table 5.

TABLE 5

| Description | Clause | M/O/C | Min | Length |
|---|---|---|---|---|
| Proactive UICC command Tag | 9.2 | M | Y | 1 |
| Length (A + B + C) | — | M | Y | 1 or 2 |
| Command details | 8.6 | M | Y | A |
| Device Identities | 8.7 | M | Y | B |
| Event list | 8.25 | M | Y | C |

It should be appreciated that the event list data object here contains the newly defined "GPS module availability" event as outlined above with regard to the first part.

Thirdly, when the GPS module switches from available to not available, or vice versa, the mobile radio communications device sends a new "envelope event download-GPS module status" to the UICC as illustrated for example in FIG. 1.

Further descriptive data is found in Table 6 below and the event list data object here contains the newly defined "GPS module availability" event as defined in the first part noted above.

TABLE 6

| Description | Clause | M/O/C | Min | Length |
|---|---|---|---|---|
| Event download tag | 9.1 | M | Y | 1 |
| Length (A + B + C) | — | M | Y | 1 or 2 |
| Event list | 8.25 | M | Y | A |
| Device identities | 8.7 | M | Y | B |
| GPS module status | 8.xx | M | Y | 1 |

The coding of the GPS module status is such that "00" relates to the GPS module being not available, or not attached, whereas the status "01" relates to the GPS module relates to confirmation that the GPS module is available or attached.

Having regard to a second embodiment of the present invention the interface can be provided on the basis of a high speed "USB-IC" interface as based ETSI TS 102 600.

It should be appreciated that the protocol stack over such an USB interface is different from that of the ISO-based interface described above such that the new commands defined in the following are no longer based on APDU and the command will generally be encapsulated into an IP packet and then sent over the USB interface.

Thus, the new commands defined in the following sections are no longer USAT commands but should be considered merely just commands per se.

The aspect of the interface allowing the UICC to inform the mobile radio communications device that services requiring GPS data are present in the UICC it is determined that the ATR returned by a USB UICC activated using the USB ICCD device class on the IC USB interface in response to an ICC_POWER_ON or a PC_to_RDR_IccPowerOn request according to the Smart Card ICCD specification (Universal Serial Bus, "Device Class Specification for USB Integrated Circuit Card Devices" (Smart Card ICCD), (Revision 1.0) shall be the same as the ATR that would be returned over the "ISO" (ETSI TS 102 221) interface.

On this basis, the same solution as employed above for this function of the UICC but in relation to and ISO interface can be employed here.

In accordance with this second embodiment of the invention allowing the mobile radio communications device to notify, the either statically or dynamically, the UICC that a GPS module is present in the mobile radio communications device, a new "Terminal Capability" command is sent from the mobile radio communications device to the UICC and further particulars of this are found in Table 7 below.

TABLE 7

| Description | Clause | M/O/C | Min | Length |
|---|---|---|---|---|
| Command Tag | — | M | Y | 1 |
| Total length | — | M | Y | 1 |
| Terminal capability data | — | M | N | X bytes |

Here as an example the command tag comprises 0x50 and the byte 1 of Terminal capability data="01" means the GPS is considered to be present. Other bytes of Terminal capability data are RFU.

While the aforementioned comprises an example of static notification, the dynamic notification can share the same features as those described below in relation to the three part functionality of the ME informing the UICC whether the GPS module is currently available or not.

The realisation of allowing the UICC to activate the GPS module relates to the definition of a new command: SETUP GPS as illustrated further below with regard to Table 8.

TABLE 8

| Description | Clause | M/O/C | Min | Length |
|---|---|---|---|---|
| Command Tag | — | M | Y | 1 |
| Total length | — | M | Y | 1 |
| GPS status | — | M | N | 1 |

Here an example of the command tag comprises 0x51 and the GPS status is such that "01" is equal to GPS activation, and "00" is equal to GPS deactivation.

Table 9 below provides further illustration of the provision of a new command allowing the mobile radio communications device to send the location data from the GPS module to the UICC and which comprises a GPS data command having a command tag of 0x52 for example but as with the embodiment above, when the coding of the GPS data is not specifically covered by the present invention although it could typically comprise raw data to be processed by the UICC applications.

TABLE 9

| Description | Clause | M/O/C | Min | Length |
| --- | --- | --- | --- | --- |
| Command Tag | — | M | Y | 1 |
| Total length | — | M | Y | 2 bytes |
| GPS data | — | M | N | Z bytes |

The command structure defined above in relation to allowing the UICC to activate the GPS module can be re-used by the interface allowing the UICC to deactivate the GPS module with the exception that the GPS status byte be set to "00".

As with the first embodiment discussed above, the technical realisation or the functionality of the interface allowing the mobile radio communications device to inform the UICC whether or not the GPS module is currently available is generally provided in three parts.

First, the existing event list is extended as defined above in the USAT feature through the addition of a new event "GPS module availability".

It should be appreciated that this Event List data object is physical interface independent and it could be extended in the same manner as the first part of the above-mentioned embodiment.

In the second part, a new Event Registration Request command is defined and that is to be sent from the UICC to the mobile radio communications device and as illustrated further in relation to Table 10.

TABLE 10

| Description | Clause | M/O/C | Min | Length |
| --- | --- | --- | --- | --- |
| Command Tag | — | M | Y | 1 |
| Total length | — | M | Y | 1 |
| Event List | — | M | N | X |

In this scenario the command tag comprises 0x80 for example and the Event List is arranged to contain the GPS module availability and as defined in the first part above.

In the third part, a new "Event Notification-GPS availability" command is defined and it is arranged to be sent from the mobile radio communications device to the UICC and as illustrated further in relation to Table 11.

TABLE 11

| Description | Clause | M/O/C | Min | Length |
| --- | --- | --- | --- | --- |
| Command Tag | — | M | Y | 1 |
| Total length | — | M | Y | 1 |
| GPS status | — | M | N | 1 |

Here the command tag comprises as an example 0x81 and the coding of GPS status is such that "00" comprises an indication that the GPS module is not available, or not attached, whereas "01" comprises an indication that the GPS module is available/attached.

A third embodiment of the present invention envisages use of a contact-less interface based on the Single Wire Protocol (SWP) and the Host Controller Interface (HCI) as currently known from ETSI SCP.

Such an interface arrangement will of course be used in the situation where the UICC applications desire to retrieve location data from a device/terminal which is external to the mobile radio communications device.

In this manner, the GPS module is then no longer the provider of the location data and the UICC applications only require such data from a remote contact-less device.

In this particular embodiment, there is used an EVT_SEND_DATA event to transparently pass the location data from the CLF in the mobile radio communications device to the UICC and as illustrated further with reference to Table 12 below.

TABLE 12

| Description | Length |
| --- | --- |
| data that are sent | N |
| RF error indicator | 1 |

This third embodiment illustrates the adaptability of the present invention.

The large memory UICC will be shortly available on the market. This would naturally lead the network Operators to integrate a growing number of applications within the UICC.

The GPS is also a technology which is more and more often integrated in recent handsets.

By providing the accurate location information from the GPS module to the UICC, we potentially offer to the network Operators a new possibility to increase their income.

They will have the possibility to develop a new category of added value services based on precise location information.

The invention claimed is:

1. A mobile radio communications device comprising:
   a source of geographical location data;
   a notifier configured to notify a universal integrated circuit card that a source of geographical location data is present by modifying at least one bit of a terminal profile;
   a receiver receiving, from the universal integrated circuit card, when the terminal profile has indicated that the source of geographical location data is present, a signal indicating that said universal integrated circuit card requires geographical location data;
   a retriever configured to retrieve the geographical location data from said source of geographical location data, and to generate a signal carrying the retrieved geographical location data, in response to receipt of said signal indicating that said universal integrated circuit card requires geographical location data; and
   a transmitter sending the generated signal carrying the retrieved geographical location data to the universal integrated circuit card.

2. The mobile radio communications device as claimed in claim 1, wherein said source of geographical location data is adapted to provide geographical location data acquired from a device which is external to the mobile radio communications device.

3. The mobile radio communications device as claimed in claim 2, wherein said signal indicating that said universal integrated circuit card requires geographical location data comprises an activation command and said mobile radio communications device comprises an activation processor activating said device or module in response to said activation command.

4. The mobile radio communications device as claimed in claim 3, wherein the receiver is adapted to receive a further signal indicating that the device or module should be deactivated, and
   said mobile radio communications device comprises a deactivation processor deactivating said device or module in response to receipt of said signal indicating that the device or module should be deactivated.

5. The mobile radio communications device as claimed in claim 4, wherein said signal indicating that the device or module should be deactivated comprises a further deactivation command.

6. The mobile radio communications device as claimed in claim 2, wherein the source of geographical location data comprises a wireless retriever configured to retrieve said geographical location data in a wireless manner from said external device.

7. The mobile radio communications device as claimed in claim 1, wherein said source of geographical location data is adapted to provide geographical location data acquired using a positioning module in the mobile radio communications device.

8. The mobile radio communications device as claimed in claim 1, wherein the notifier is configured to provide a static notification that a source of geographical location data is present.

9. The mobile radio communications device as claimed in claim 1, wherein the signal carrying the retrieved geographical location data comprises an envelope command.

10. The mobile radio communications device as claimed in claim 9, wherein the envelope command comprises a data object carrying said geographical location data, and
    the envelope command comprises a tag indicating the envelope command carries geographical location data.

11. The mobile radio communications device as claimed in claim 1, wherein said receiver is configured to receive a signal indicating that an application requiring geographical location data is present within the universal integrated circuit card.

12. The mobile radio communications device as claimed in claim 11, wherein the signal indicating that an application requiring geographical location data is present within the universal integrated circuit card uses an interface byte of an Answer To Reset.

13. The mobile radio communications device as claimed in claim 1, wherein the mobile radio communications device is configured to use a Universal Subscriber Identity Module Application Toolkit based interface for communication with said universal integrated circuit card, and the signal indicating that said universal integrated circuit card requires geographical location data comprises a Universal Subscriber Identity Module Application Toolkit.

14. The mobile radio communications device as claimed in claim 13, wherein the signal carrying the retrieved geographical location data comprises a Universal Subscriber Identity Module Application Toolkit envelope command.

15. The mobile radio communications device as claimed in claim 1, comprising means for informing the universal integrated circuit card regarding the availability of the source of geographical information.

16. The mobile communications device as claimed in claim 1, wherein the signal indicating that said universal integrated circuit card requires geographical location data serves as a request to the mobile radio communications device to send geographical location data to the universal integrated circuit card.

17. A method, performed by a mobile radio communications device having a source of geographical location data, of providing said geographical location data to a universal integrated circuit card, the method comprising:
    notifying the universal integrated circuit card that said source of geographical location data is present by modifying at least one bit of a terminal profile;
    receiving, from the universal integrated circuit card, when the terminal profile has indicated that the source of geographical location data is present, a signal indicating that said universal integrated circuit card requires geographical location data;
    retrieving geographical location data from said source of geographical location data, and generating a signal carrying the retrieved geographical location data, in response to receipt of said signal indicating that said universal integrated circuit card requires geographical location data; and
    sending the generated signal carrying the retrieved geographical location data to the universal integrated circuit card.

18. A method of facilitating transmission of geographical location data with a universal integrated circuit card interface for use in a mobile radio communications device, the method comprising:
    enabling, by the universal integrated circuit card interface, the mobile radio communications device to notify the universal integrated circuit card that a source of geographical location data is present in said mobile radio communications device by modifying at least one bit of a terminal profile;
    enabling, by the universal integrated circuit card interface, the mobile radio communications device to receive, when the terminal profile has indicated that the source of geographical location data is present, a signal indicating that said universal integrated circuit card requires geographical location data; and
    enabling, by the universal integrated circuit card interface, the mobile radio communications device to send a signal carrying said geographical location data to said universal integrated circuit card.

19. A computer program product comprising computer implementable instructions which when implemented on a programmable computer device realise a method according to claim 17.

20. A computer program product comprising computer implementable instructions which when implemented on a programmable computer device realize a method of facilitating transmission of geographical location data with the universal integrated circuit card interface according to claim 18.

* * * * *